United States Patent
Wiederhöft et al.

(10) Patent No.: US 7,586,688 B2
(45) Date of Patent: Sep. 8, 2009

(54) ELECTRONIC MICROSCOPE

(75) Inventors: Holger Wiederhöft, Jena (DE); Helmut Meissner, Jena (DE)

(73) Assignee: Carl Zeiss MicroImaging GmbH, Jena (DE)

(*) Notice: Subject to any disclaimer, the term of this patent is extended or adjusted under 35 U.S.C. 154(b) by 290 days.

(21) Appl. No.: 10/546,020

(22) PCT Filed: Feb. 18, 2004

(86) PCT No.: PCT/EP2004/001559
§ 371 (c)(1),
(2), (4) Date: Oct. 19, 2006

(87) PCT Pub. No.: WO2004/080076
PCT Pub. Date: Sep. 16, 2004

(65) Prior Publication Data
US 2007/0121204 A1 May 31, 2007

(30) Foreign Application Priority Data
Feb. 19, 2003 (DE) ................. 103 06 970

(51) Int. Cl.
*G02B 21/02* (2006.01)
(52) U.S. Cl. ..................... 359/656; 359/369
(58) Field of Classification Search ......... 359/656–661, 359/369, 379–380
See application file for complete search history.

(56) References Cited

U.S. PATENT DOCUMENTS

| | | | |
|---|---|---|---|
| 3,353,891 A * | 11/1967 | Rosenberger | ............... 359/380 |
| 4,202,037 A | 5/1980 | Glaser et al. | |
| 4,206,966 A | 6/1980 | Tyson et al. | |
| 4,361,377 A | 11/1982 | Pullen | |
| 5,031,099 A | 7/1991 | Kettler | |
| 5,694,242 A | 12/1997 | Omi | |
| 6,219,181 B1 | 4/2001 | Yoneyama et al. | |

(Continued)

FOREIGN PATENT DOCUMENTS
DE 196 09 288 A1 9/1996
(Continued)

OTHER PUBLICATIONS
"Diagonal 11 mm (Type 2/3) Progressive Scan CCD Image Sensor With Pixel For B/W Cameras," Sony, May 19, 2004; <URL: http://web.archive.org/web/20030210142121/http://www.sony.co.jp/{semicon/english/90203.html}>.
(Continued)

*Primary Examiner*—Jordan M. Schwartz
(74) *Attorney, Agent, or Firm*—Patterson, Thuente, Skaar & Christensen, P.A.

(57) ABSTRACT

The invention relates to a microscope having an optics system which represents an object on an image sensor and a screen that shows the image data provided by the image sensor and which is the only output medium for visually observing the object, wherein the representation capability of the optics system and the resolution (A) of the image sensor complies with the following correlation: F×N/M=0.5 A, wherein F indicates a factor, N indicates the numerical aperture of the optics systems, M is the magnification factor and A indicates the resolution of the image sensor in pixels per millimeter.

18 Claims, 2 Drawing Sheets

U.S. PATENT DOCUMENTS

| | | | |
|---|---|---|---|
| 6,452,625 B1 * | 9/2002 | Kapitza | 348/80 |
| 6,483,948 B1 | 11/2002 | Spink et al. | |
| 6,907,390 B1 * | 6/2005 | Reffner et al. | 703/5 |
| 2001/0028391 A1 | 10/2001 | Iko | |
| 2004/0051957 A1 * | 3/2004 | Liang | 359/656 |
| 2005/0056767 A1 * | 3/2005 | Kaplan et al. | 250/208.1 |

FOREIGN PATENT DOCUMENTS

| | | |
|---|---|---|
| DE | 196 35 666 C1 | 12/1997 |
| DE | 101 14 757 A1 | 10/2001 |
| EP | 0 380 904 A1 | 8/1990 |
| GB | 2 084 754 A | 4/1982 |
| JP | 05127087 A | 5/1993 |
| JP | 07199077 A | 8/1995 |
| JP | 08101437 A | 4/1996 |
| JP | 09018772 A | 1/1997 |
| JP | 10307262 A | 11/1998 |
| JP | 10339545 A | 12/1998 |
| WO | WO 96/20421 | 7/1996 |
| WO | WO 01/27679 A1 | 4/2001 |

OTHER PUBLICATIONS

"Diagonal 9.04mm (Type 1/1.8) Frame Readout CCD Image Sensor with a Square Pixel for Color Cameras," Sony Corp., Feb. 10, 2003; <URL: http://web.archive.org/web/20030210142121/http://www.sony.co.jp/ {semicon/english/90203.html>.

Internet page of "Industrial Consumer Products Health Care & Life Science, Olympus microscopy," Dec. 13, 2000; http://www.olympus-europa.com/mikro/products/system/videomicroscope_sys/.../pv10.st.

"Digital Microscope, PCS-81X", prior to Feb. 19, 2003.

* cited by examiner

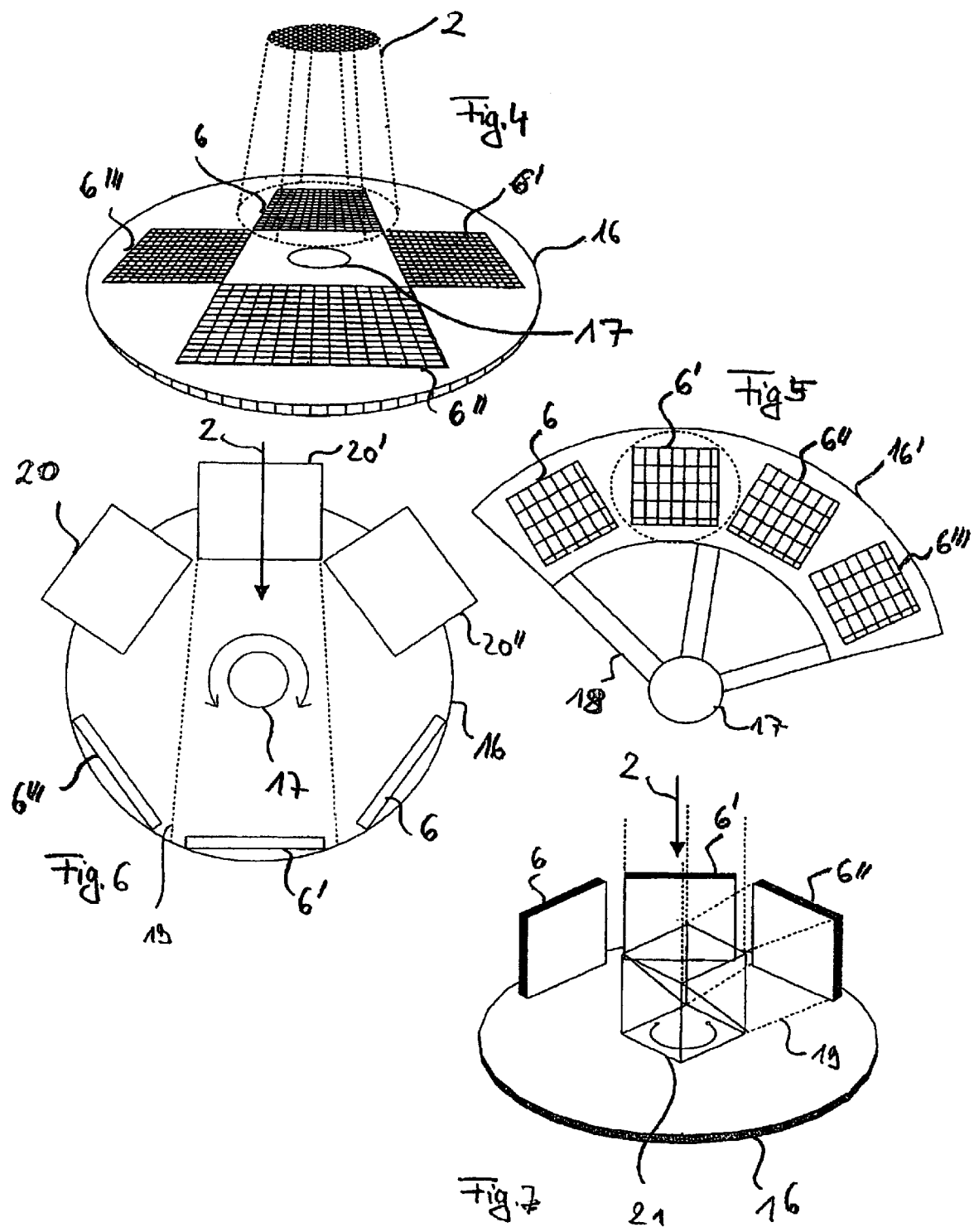

ELECTRONIC MICROSCOPE

FIELD OF THE INVENTION

The invention relates to a microscope comprising an optical system, which images an object onto an image sensor, and a screen which displays image data, output by the image sensor, as an image and which is the only output medium for a visual inspection of the object.

BACKGROUND OF THE INVENTION

Such electronic microscopes which image an object onto an electronic image sensor by means of optical systems are known. In this case, the omission of direct optical inspection enables a small, compact design of the microscope and allows the required optical components to be kept to a minimum. In this regard, these microscopes of the mentioned type as described by DE 196 09 288 A1, wherein a microscope is integrated into a mounting slot of a computer, are clearly superior to conventional microscopes comprising additionally a mounted camera which feeds a screen, such as those known, for example, from U.S. Pat. No. 4,202,037 or U.S. Pat. No. 5,694,242. The same applies to a generic microscope of the type distributed by Olympus under the product name EV10. These known solutions use very complex optical systems; this makes simplifications and/or reductions in production costs necessary.

Therefore, it is an object of the invention to simplify a microscope of the aforementioned type such that optical complexity can be kept to a minimum.

SUMMARY OF THE INVENTION

According to an embodiment of the invention, this object is achieved by a microscope of the aforementioned type, wherein the imaging performance of the optical system and the resolution A of the image sensor satisfy the relationship $F \times N/M \leq 0.5 A$, wherein F indicates a factor, N is the numerical aperture of the optical system, M is the magnification factor of the optical system and A is the resolution of the image sensor in pixels per millimeter.

The concept of the invention envisages to adapt the optics arranged preceding the image sensor and the resolution of the sensor to each other. In the prior art, electronic microscopes have generally been obtained by simply combining known microscope optics with an image sensor. In this case, however, the optical system is usually "over-designed" in terms of its resolution relative to the image sensor, i.e. the optical system is unnecessarily complex. The inventive relationship between the resolution of the optical system and the image sensor allows this unnecessary complexity to be avoided, which has an effect not only on the finally possible selling price of an instrument, but also on its physical size.

In contrast to the approach pursued by the prior art, the inventive relationship between the numerical aperture and the magnification of the optical system as well as the resolution of the image sensor now surprisingly assumes, that the image sensor can also be a resolution-limiting element as shown by the inequality. An optimal interplay is achieved if the left side and the right side of the dimensioning rule according to the invention are as equal as possible.

On the one hand, this allows optimal use of the resolution achievable by the image sensor and ensures that no unnecessary optical complexity is generated. On the other hand, the optical system is fully utilized by the image sensor with regard to resolution. On the whole, this allows to achieve cost-saving production of the instrument. Complex optical systems which create an information gain in terms of resolution, which gain could ultimately not be utilized by the image sensor, are avoided. A maximal result can be achieved with a minimum of optical complexity.

This aspect becomes important, in particular, with regard to the presently ever-increasing resolution of CCD image sensors, because in some cases, the optical system may, in future, tend to become the resolution-limiting element in future, whereas presently, the optical performance of the image sensor is decisive for the entire system.

The factor contained in the dimensioning rule according to the invention is preferably wavelength-dependent and ensures that the left side of the relationship according to the invention essentially indicates the resolution represented by the optical system. For visible radiation, a factor of approximately 3000 is convenient, because the left side of the relationship will then reflect the optical resolution of microscope optics with particular precision. If one wishes to take the wavelength dependence of resolution into account in an even more accurate approximation, $F=10/(0.61 L)$ should be fulfilled, wherein L is a wavelength, indicated in millimeters, of the optical radiation picked up by the optical system and focused onto the image sensor. The wavelength L may be, in particular, the average wavelength of the optical radiation used. For light, a value of 0.00582 mm may be used.

However, the factor F not only serves to reflect a possible wavelength dependence of the resolution performance of an optical system, but it should also take into account a slight deviation from the above-mentioned optimal adaptation, which may be given, for example, by constraining conditions of manufacturing technology.

The invention now enables an adaptation both by adapting the optics to the image sensor and vice versa. A mutual adaptation is possible, too.

The invention achieves a particular advantage in one embodiment by adapting the effective resolution of the image sensor in an optical system with adjustable magnification to the magnification factor of the optical system by means of a control device. By said adaptation it remains ensured that the resolutions of the optical system and of the image sensor match even for variable magnification factors, i.e. that no "empty" magnification occurs which results in no information gain. This procedure allows a maximal result to be achieved, even for a variable magnification, with minimal optical complexity and minimal complexity in terms of image sensor technology.

A particularly easy-to-realize system for adapting the effective resolution of the image sensor is a changing device comprising a multiplicity of image sensors having different resolutions, which image sensors can be switched into the optical path of the microscope. The changing device may be provided, for example, as a switchable optical unit, which selectively places one of several image sensors in the optical path of the optical system. For example, use may be made of a changing wheel carrying a plurality of image sensors, which switches between image sensors in order to adapt the resolution.

Alternatively, the effective resolution of the image sensor may also be changed electronically by respectively combining several pixels of the image sensor in larger units. This is known to the persons skilled in the art as pixel binning. Such combining may be effected either directly at sensor level or at subsequently arranged image processing means in the control device, which may be a computer, for example. Of course, the aforementioned approaches of adapting the resolution of the image sensor can be employed not only individually, but also in combination.

As an alternative or in addition to adapting the resolution of the image sensor, an adaptation of the visual field may also be effected, wherein the visual field is respectively imaged by the optical system onto the image sensor such that a part of the image sensor is illuminated which corresponds to the desired resolution of the visual field. Therefore, the optical system preferably has an adjustable magnification, and a device for changing the numerical aperture of the optical system as well as a control device is provided, which adapts the numerical aperture to the magnification of the optical system and/or the effective resolution in order to satisfy the above-mentioned relationship as far as possible.

The concept according to the invention makes a very compact microscope possible. Therefore, it is preferred to provide a housing into which the optical system and the control device are integrated. The compact design allows to provide an almost infinite semi-space as the volume for the object to be examined. Therefore, in this connection, it is preferred for the housing to have an object support located on the upper surface of the housing as well as an incident-light source for illumination of the object, said light source being integrated in the housing and located below the upper surface of the housing.

In order to avoid the aforementioned "empty" resolution, i.e. a resolution which does not yield any further information gain, the resolution of the image sensor is preferably greater than or equal to the resolution of the screen. Again, this reflects the finding underlying the invention that the image sensor can be and advantageously even should be the element determining the total resolution of the system. Of course, the screen may contribute to magnification. The size of the screen is, of course, essential for the total magnification with which an image of the object is represented on the screen. Therefore, it is preferred to use as big a screen as possible for strong magnifications.

BRIEF DESCRIPTION OF THE FIGURES

The invention will be explained in more detail below, by way of example and with reference to the drawing, wherein:

FIG. 4 shows a changing unit comprising a plurality of image sensors used in the microscope of FIG. 1, and FIGS. 5-7 show alternative embodiments of the changing unit of FIG. 4.

DETAILED DESCRIPTION

Figure 1:
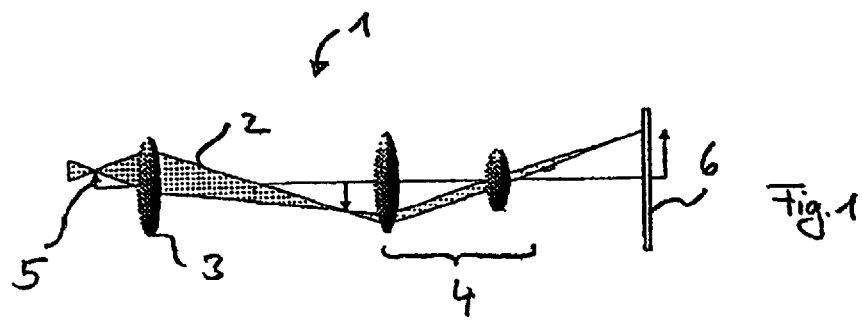
FIG. 1 shows a schematic view of an optical path in a microscope.

FIG. 1 schematically shows a microscope 1. Using an optical path 2, an object 5 is imaged in magnified form onto a CCD sensor 6 by means of an objective 3 and an eyepiece which is provided as zoom optics 4. An optical viewing port is not provided for the microscope 1.

Figure 2:
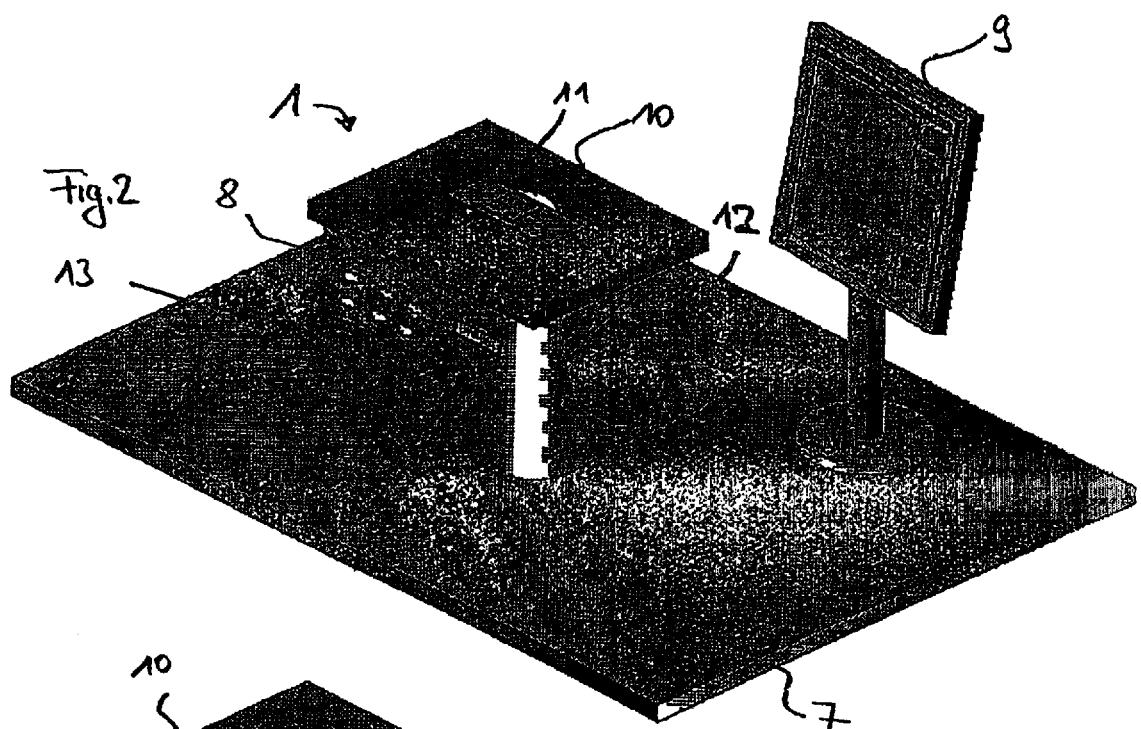
FIG. 2 shows an electronic microscope.

FIG. 2 shows the microscope 1 in a perspective view. On a table 7, a housing 8 of the microscope is arranged which accommodates both the optical system and the control electronics in the form of a computer. An image of the object to be examined in the microscope 1 is displayed on an LCD screen 9. The housing has an upper surface 10 on which an object support 11 is located. The microscope 1 is operated by means of a handwheel 12 for focusing as well as by means of a control panel 13.

Figure 3:
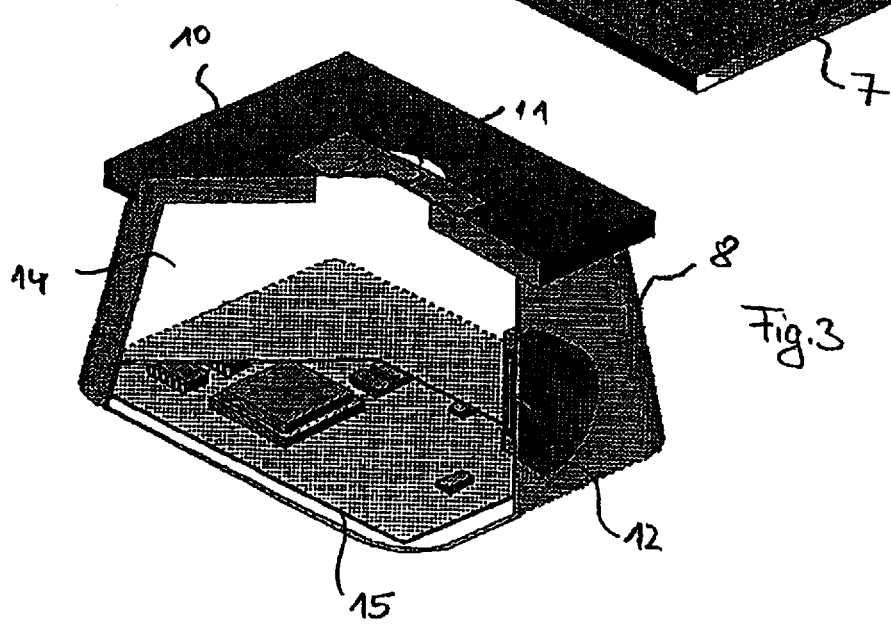
FIG. 3 shows the microscope of FIG. 1 with the housing represented in a partially cut-away view.

As shown in FIG. 3, a constructional space 14 for the optics schematically shown in FIG. 1 as well as for the CCD sensor 6 is located in the housing 8; for the sake of clarity, however, these are not shown in FIG. 3. Below the constructional space 14, there is a control device 15 which is provided as a computer comprising a processor as well as memory units and interfaces for input/output of data. In particular, the control device 15 supplies the required image data to the LCD screen 9.

The resolution of the objective 3 and of the zoom optics 4 of the microscope 1 is adapted to the resolution of the image sensor 6 according to the following relationship: $F \times N/M \leq 0.5$ A, wherein F indicates a factor, N is the numerical aperture of the optical system, M is the magnification factor of the optical system and A is the resolution of the image sensor in pixels per millimeter. For a light microscope, the factor F is between 2,800 and 3,200. For a microscope using optical radiation beyond or at the border of the visible spectral range, $F=10/(0.61 L)$ applies, with the wavelength of the radiation used given in millimeters. Of course, the equation for F may also be applied when using light, but in this case, dimensioning according to the above interval is easier.

Below the object support 11, there is a slot in which the objective 3 is arranged. The objective is releasably mounted by means of a lock so that the microscope 1 can be adapted to different tasks by changing the objective. In order to satisfy the above-mentioned relationship as an equation, if possible, even when changing the objective or adjusting the zoom optics 4, a changing device for changing the image sensor is provided in the constructional space 14. In a first embodiment of said changing device, which is shown in FIG. 4, a changing wheel 16 is used, which is rotatably supported on an axis 17 and carries a plurality of sensors 6, 6', 6" and 6'". The changing wheel 16 rotates in the optical path 3 of the microscope 1 so as to use the image sensor with the desired resolution.

In an alternative embodiment, shown in FIG. 5, the changing wheel is provided as an annular disk, which is connected to the axis 7 via a plurality of arms 18. This design allows the number of sensors 6 to be further increased.

As an alternative to the use of a changing wheel 16, a deflected optical path 19 may also be used, wherein the optical path 2 is deflected to an image sensor 6 by means of a deflecting mirror 20. Arranging the deflecting mirror 20 and the CCD sensor 6 opposite each other has the effect that a rotation of the changing wheel 16 changes the active CCD sensor. This design is more space-saving as compared to the design of FIG. 4, because the CCD sensors are parallel to the axis 17. In the design shown in FIG. 6, they are perpendicular to the changing wheel 16.

FIG. 7 shows a further alternative of the changing device, wherein the number of movable parts is minimized. The changing wheel 16 is stationary, and a deflecting prism 21 is mounted as a rotatable deflecting unit on an axis of rotation, said prism directing the deflected optical path 19 onto the respectively selected CCD sensor 6. Using this design, a particularly great number of CCD sensors 6 may be used with a compact structure. At the same time, these CCD sensors 6 can be permanently wired, because they need not be movable themselves.

As an alternative or in addition to changing the CCD sensor 6, an adaptation of the visual field may also be effected, wherein the visual field is respectively imaged by the zoom optics 4 onto the CCD sensor such that the visual field illuminates that part of the CCD sensor 6 which corresponds to the resolution required in order to fulfill the above relationship. Thus, the numerical aperture of the optical system formed by the objective 3 and the zoom optics 4 is adapted to the changed magnification. The pixels on the CCD sensor which are not illuminated are filtered or blocked out by the control device 15 and are not displayed on the LCD screen 9.

The invention claimed is:

1. A microscope, comprising:
   an image sensor;
   an optical system adapted to image an object onto the image sensor;
   a display adapted to display image information provided by the image sensor, wherein the display is a sole output medium of the microscope for visual inspection of the object; and
   wherein the optical system and image sensor are configured such that a ratio of numerical aperture to magnification factor of the optical system, scaled by a selected scaling factor, is less than or equal to about one-half of a resolution of the image sensor in pixels per millimeter and further wherein the scaling factor has a value determined by the formula $10/(0.61*L)$ wherein L is the average wavelength of radiation focused onto the image sensor in millimeters.

2. The microscope of claim 1, wherein the scaling factor is about 3000.

3. The microscope of claim 1, wherein the optical system has an adjustable magnification; and
   wherein the microscope further comprises:
      a device for changing the effective resolution of the image sensor; and
      a control device that adapts the effective resolution to the magnification factor.

4. The microscope of claim 3, wherein the control device is adapted to combine a plurality of pixels of the image sensor by pixel binning.

5. The microscope of claim 3, and further comprising:
   a housing into which the optical system and the control device are integrated.

6. The microscope of claim 5, wherein the housing has an upper housing surface, an object support at the upper housing surface, and an incident-light source for illuminating the object.

7. The microscope of claim 1, and further comprising:
   a changing device having a plurality of image sensors.

8. The microscope of claim 7, wherein the changing device includes a switchable optical unit that selectively places one of the pluralities of image sensors in an optical path of the optical system.

9. The microscope of claim 8, wherein the optical unit includes a changing wheel carrying the plurality of image sensors.

10. The microscope of claim 1, wherein the optical system has an adjustable magnification; and
    wherein the microscope further comprises:
       a device for changing the numerical aperture of the optical system; and
       a control device that adapts the numerical aperture to at least one of the magnification and the resolution of the image sensor or both the magnification and the resolution of the image sensor.

11. The microscope of claim 1, wherein the resolution of the image sensor is greater than or equal to the resolution of the display.

12. A method of displaying a magnified image of an object, the method comprising:
    optically coupling an image sensor to the object via an optical system;
    electrically coupling an output of the image sensor to a visual display;
    configuring the optical system to the image sensor such that a ratio of numerical aperture to magnification factor of the optical system, scaled by a selected scaling factor, is less than or equal to about one-half of a resolution of the image sensor in pixels per millimeter; and
    wherein the scaling factor has a value determined by the formula $10/(0.61*L)$ wherein L is the average wavelength of radiation focused onto the image sensor in millimeters.

13. The method of claim 12, and further comprising:
    combining pixels of the image sensor by pixel binning.

14. The method of claim 12, and further comprising:
    adjusting the magnification of the optical system;
    changing the numerical aperture of the optical system; and
    adapting the numerical aperture to at least one of the magnification and the resolution of the image sensor or both the magnification and the resolution of the image sensor.

15. The method of claim 12, and further comprising:
    adjusting the magnification of the optical system;
    changing the effective resolution of the image sensor to a new effective resolution; and
    adapting the new effective resolution to the magnification factor.

16. The method of claim 12, and further comprising:
    selectively optically coupling at least one of a plurality of different image sensors to the object.

17. A microscope, comprising:
    an electronic image sensor;
    an optical system adapted to image an object onto the image sensor;
    a display adapted to display image information provided by the image sensor; and wherein the optical system and image sensor are configured such that a ratio of numerical aperture to magnification factor of the optical system, scaled by a scaling factor that is based on a wavelength of radiation detected by the image sensor, is less than or equal to about one-half of a resolution of the image sensor in pixels per millimeter and further wherein the scaling factor is determined by the formula $10/(0.61*L)$ wherein L is the average wavelength of radiation focused onto the image sensor in millimeters.

18. A microscope, comprising:
    an image sensor;
    an optical system adapted to image an object onto the image sensor;
    a display adapted to display image information provided by the image sensor, wherein the display is a sole output medium of the microscope for visual inspection of the object; and
    wherein the optical system and image sensor are configured such that a ratio of numerical aperture to magnification factor of the optical system, scaled by a selected scaling factor, is less than or equal to about one-half of a resolution of the image sensor in pixels per millimeter and further wherein the scaling factor has a value between 2800 and 3200.

* * * * *

UNITED STATES PATENT AND TRADEMARK OFFICE
CERTIFICATE OF CORRECTION

PATENT NO. : 7,586,688 B2
APPLICATION NO. : 10/546020
DATED : September 8, 2009
INVENTOR(S) : Wiederhöft et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 623 days.

Signed and Sealed this

Fourteenth Day of December, 2010

David J. Kappos
*Director of the United States Patent and Trademark Office*